United States Patent [19]

Patel et al.

[11] Patent Number: 5,145,511
[45] Date of Patent: Sep. 8, 1992

[54] METHOD FOR MANUFACTURING A METALLIZED LUMINESCENT SCREEN FOR A CATHODE-RAY TUBE

[75] Inventors: Himanshu M. Patel, Rome; Antimo Pezzulo, Anagni, both of Italy

[73] Assignee: Videocolor SpA, Anagni, Italy

[21] Appl. No.: 789,709

[22] Filed: Nov. 8, 1991

[51] Int. Cl.⁵ .................. C03B 23/20; C03C 17/38
[52] U.S. Cl. ..................................... 65/42; 65/43; 65/60.2; 427/64; 427/68; 445/40; 445/45
[58] Field of Search ............. 65/36, 42, 43, 60.2, 65/60.3; 427/64, 68; 445/40, 45

[56] References Cited

U.S. PATENT DOCUMENTS

| | | |
|---|---|---|
| 3,067,055 | 12/1962 | Saulnier . |
| 3,582,390 | 6/1971 | Saulnier . |
| 3,652,323 | 3/1972 | Smith . |
| 4,154,494 | 5/1979 | Skinner et al. . |
| 4,217,015 | 8/1980 | Matsumoto et al. . |
| 4,350,514 | 9/1982 | Akiyama et al. ............... 65/36 |
| 4,482,579 | 11/1984 | Fujii et al. ..................... 427/43 |
| 4,493,668 | 1/1985 | Piascinski ...................... 445/40 |
| 4,826,463 | 5/1989 | Strauss ........................... 445/45 |
| 4,923,423 | 5/1990 | Stockdale et al. ........... 65/43 X |

Primary Examiner—Robert L. Lindsay
Attorney, Agent, or Firm—Joseph S. Tripoli; Dennis H. Irlbeck; Vincent J. Coughlin, Jr.

[57] ABSTRACT

A method for manufacturing a metallic, luminescent screen for a CRT includes the steps of: depositing at least one phosphor layer on an inner surface of a faceplate of a panel, to form the luminescent screen; preheating the panel containing the screen to a temperature in excess of a minimum film-forming temperature; and depositing an aqueous emulsion of at least one acrylic film-forming resin onto a screen and drying said emulsion to form the film. Then, a metallic coating is deposited onto the film and the panel bearing the metallized screen is sealed to a funnel by heating the panel and funnel through a sealing cycle. The sealing cycle has predetermined rates of temperature increase and includes a temperature range within which the film is volatilized. The rate of temperature increase within the volatilization range is less than the rate of temperature increase in other portions of the sealing cycle.

9 Claims, 2 Drawing Sheets

METHOD FOR MANUFACTURING A METALLIZED LUMINESCENT SCREEN FOR A CATHODE-RAY TUBE

This invention relates to a novel method for manufacturing a metallized luminescent screen on a faceplate of a panel of a cathode-ray tube (CRT) and, more particularly, to a method of depositing, on the luminescent screen, a single layer of an aqueous filming emulsion, with low organic content, which can be volatilized while simultaneously sealing the panel to a funnel of the CRT.

BACKGROUND OF THE INVENTION

Some prior filming methods utilized solvent-based filming lacquers which were deposited onto a wet or prewetted phosphor layer to produce a thin, continuous film on which the subsequently evaporated metal layer is condensed. The solvent-based lacquers were deposited by a spray-filming process, known in the art, which is very sensitive to variations in spraying parameters and requires special safety and environmental controls, because of the volatile nature of the solvent base. While such solvent-based films provide excellent results and permit a combined panel bake and frit seal of the panel to the CRT funnel, current practice is to use a water-based emulsion film.

U.S. Pat No. 3,067,055, issued to T. A. Saulnier, Jr., on Dec. 4, 1962, describes a process for coating the screen with such an aqueous emulsion. The emulsion contains a copolymer of an alkyl methacrylate and methacrylic acid. The panel bearing the screen is heated as the aqueous emulsion is coated thereon, to produce a dry, volatilizable film. A layer of metal, such as aluminum, is deposited on the surface of the film, and then, the film is volatilized. The purpose of the film is to bridge the irregular surface of the phosphor particles which make up the screen, and to provide a taut, suspended substrate onto which the evaporated metal is condensed to form a mirror-like surface, to reflect light from the screen. Although the film is pierced by many of the protruding phosphor particles on which it is suspended, these particles serve to plug or obstruct the holes in the film and, thus, prevent significant metal penetration to the underlying screen. Vacuum deposition of the metallic layer leaves it suspended in an exact replica (including the holes) of the film's top surface. The screen is then "baked-out" at an elevated temperature of about 410° to 440° C. to remove the film and the organic binders of the phosphors. The gaseous products formed during "bake-out" escape through the holes in the metal layer. A drawback of the process, described in U.S. Pat. No. 3,067,055 is that the single coating of the disclosed filming material provides a system which is difficult to control for light output, and which requires a slow prebake of the screen, in order to remove substantially all of the organic materials.

U.S. Pat. No. 4,217,015, issued to S. Matsumoto et al., on Aug. 12, 1980, describes a CRT-making process in which a thicker film, with a higher acrylic resin content (34 to 40% by weight), is used to increase the brightness of a tube having a "no-mill" (i.e., non-ball milled) phosphor screen. Frit sealing of the panel to the funnel is performed simultaneously with the bake-out of the screen; however, a hollow pipe is disposed within the tubular neck portion of the funnel to provide sufficient air, within the sealed envelope, to volatilize the organic binders in the phosphor screen and to remove the acrylic resin film. The pipe tends to permit dust particles to be drawn into the tube envelope from the sealing furnace and also scratches the neck of the funnel, resulting in neck cracks during stem sealing. Additionally, modification of the sealing furnace is required to accommodate the pipes, one of which fits into the neck of each tube.

U.S. Pat. No. 4,350,514, issued to Akiyama et al., on Sep. 21, 1982, discloses a method of simultaneously baking-out the organic constituents of the phosphor screen and the film, and sealing the panel to the funnel. Oxygen-rich air is introduced into a sealing furnace in the zones of the furnace where the temperature increases from about 300° C. to portions of the furnace where the temperature reaches about 450° C. The oxygen-rich air is sufficient to volatilize the organics of the screen and the film.

Each of the aforementioned processes has one or more drawbacks including safety and environmental considerations, insufficient screen brightness caused by filming difficulties, special equipment required to provide sufficient oxygen to decompose thick film layers, tube scrap caused by drawing dirt into the tube and sealing scrap resulting from scratches in the neck of the funnel. The present invention is directed to a manufacturing process utilizing an aqueous emulsion that does not require a dedicated panel bake prior to frit seal, but which permits a simultaneous screen bake and frit seal, without the need for introducing additional oxygen into the tube. Tubes produced by this process have a screen brightness at least comparable to that achieved using a dedicated panel bake.

SUMMARY OF THE INVENTION

The present invention relates to a method for manufacturing a metallized, luminescent screen for a CRT. At least one phosphor layer is deposited on an inner surface of a faceplate of a panel to form the luminescent screen. The panel containing the screen is then preheated to a temperature in excess of a minimum film-forming temperature and an aqueous emulsion of at least one acrylic film-forming resin is deposited onto a screen and dried to form the film. Next, a metallic coating is deposited onto the film and the panel, bearing the metallized screen, is sealed to a funnel by heating the panel and funnel through a sealing cycle. The sealing cycle has predetermined rates of temperature increase and includes a temperature range within which the film is volatilized. The rate of temperature increase within the volatilization range of the film is less than the rate of temperature increase in other portions of the sealing cycle.

DETAILED DESCRIPTION OF THE INVENTION

The steps of the novel method are similar to those used for making a conventional shadow-mask CRT, except that the aqueous filming emulsion of the present invention has a lower concentration of organic materials than most prior aqueous filming emulsions and the panel sealing step includes a sealing cycle which incorporates a rate of temperature increase, through at least a portion of the cycle, sufficient to volatilize the film, formed during a prior step, without the introduction of additional oxygen into the bulb.

Figure 1:
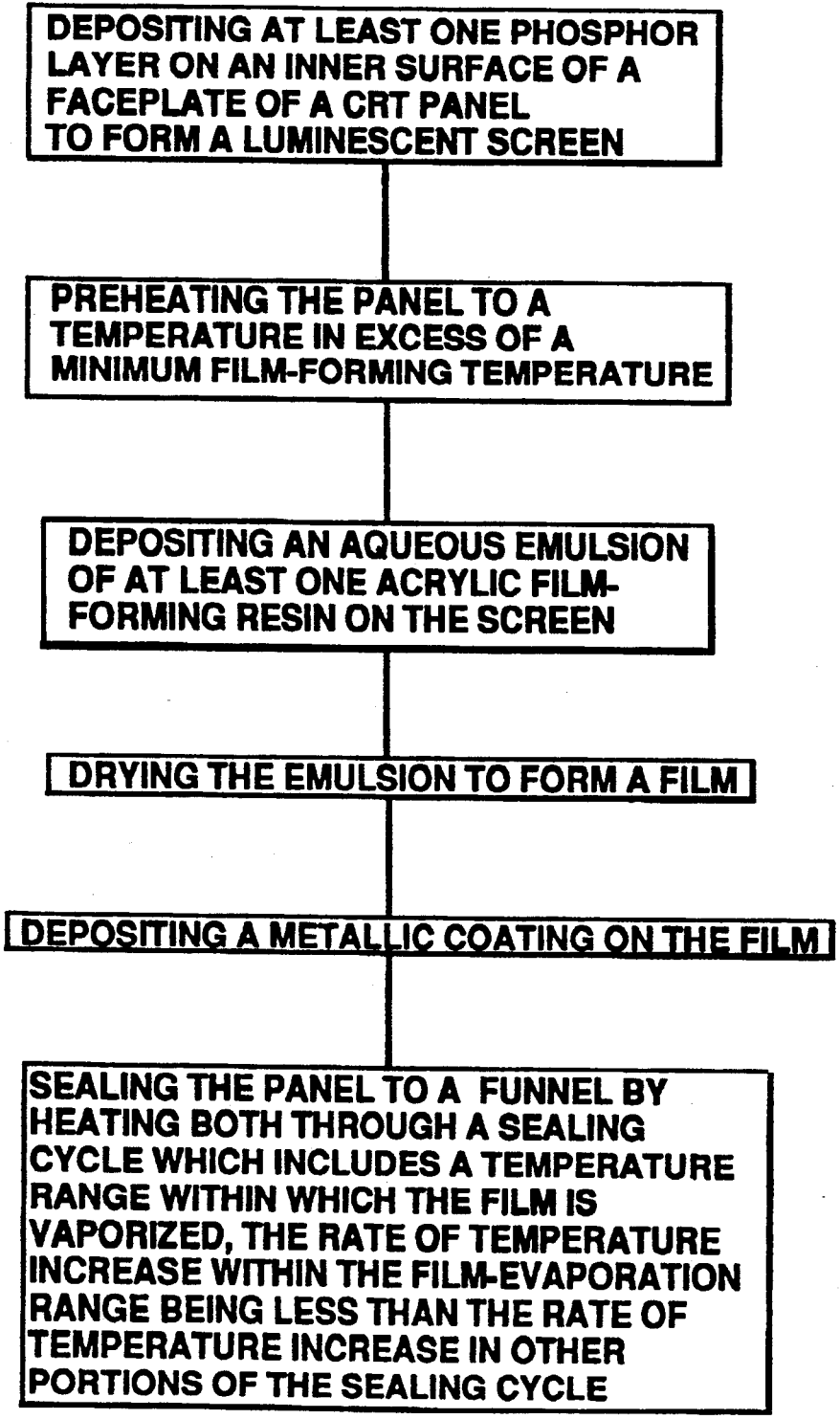
FIG. 1 is a block diagram illustrating the method of the present invention.

The novel method for manufacturing a metallized luminescent screen for a cathode-ray tube, such as a color television picture tube or a display tube, is illustrated in the block diagram of FIG. 1. At least one, and preferably three layers of successively deposited screen elements comprised of red-emitting, green-emitting and blue-emitting phosphor stripes or dots are arranged in color groups, or picture elements, in a cyclic order, on an inner surface of a faceplate of a glass panel, to form a luminescent screen.

Following formation of the screen, the panel is detachably secured to a holding means capable of tilting and rotating the panel at various speeds ranging from 6 to 200 rpm. The panel containing the phosphor screen is rotated in a vertical direction at a speed of 20 to 60 rpm and is preheated with infrared heaters to a temperature of about 50° C., which is about 5° to 25° C., and preferably at least 10° C., in excess of the minimum film-forming temperature of a novel aqueous filming emulsion described below. A quantity of 200 to 500 ml. of the novel filming emulsion is dispersed onto the rotating panel as a limp stream which has a trajectory which contacts the surface of the screen substantially tangentially thereto, and thus passes along the surface and drains therefrom, in the manner described in U.S. Pat. No. 3,652,323, issued to B. K. Smith on Mar. 28, 1972. After the surface of the screen is coated with the filming emulsion, the panel is rotated at a speed of 60 to 200 rpm for about 5 to 30 seconds, to remove the excess emulsion. In practice, the emulsion wets the screen surface readily and fills the screen pores or capillaries, and some of the emulsion solids are distributed over the screen surface due to inhibition of water from the emulsion. The panel is heated by the infrared heaters to dry the emulsion and form a substantially continuous, thin glossy film.

Following filming, the dry film is metallized in a manner similar to that described in U.S. Pat. No. 3,067,055, issued on Aug. 5, 1959, and U.S. Pat. No. 3,582,390, issued on Jun. 1, 1971, both to T. A. Saulnier, Jr. Prior to metallization, an aqueous solution of oxalic acid, boric acid, or a suitable silicate, is sprayed onto the inner portion of the panel outside the screen area. The sprayed portion includes at least the blend radius, i.e., the encurvated surface of the faceplate panel, and the skirt, or sidewall. The sprayed material forms a rough surface which provides minute holes in the metallic coating to prevent blistering of the coating during film bakeout, and to increase the adherence of the metallic coating to the underlying surface.

The filming emulsion may be prepared with the following stock solutions:

Solution A—an aqueous emulsion containing about 46 weight percent of an acrylate resin copolymer emulsified in deionized water, and with a pH between 9 and 10. An emulsion of this type is marketed under the brand name RHOPLEX AC-73 by ROHM and HAAS Co., Philadelphia, Pa.;

Solution B—an aqueous emulsion containing about 38 weight percent of a acrylate resin copolymer emulsified in deionized water, and with a pH of between 3 and 4. One such emulsion is RHOPLEX B-74, also marketed by ROHM and HAAS, Co., Philadelphia, Pa.;

Solution C—an aqueous solution containing about 30 weight percent of colloidal silica, such as the solution sold commercially under the name LUDOX AM, marketed by E. I. DUPONT DE NEMOURS, Wilmington, Del.; and Solution D—An aqueous solution containing 30 weight percent of $NH_4OH$; and Solution E—An aqueous solution containing 30 weight percent of $H_2O_2$.

EXAMPLE 1

The filming emulsion has the following composition: 5.0 weight percent of an alkaline-based emulsion, such as RHOPLEX AC-73, 5.0 weight percent of an acid-based emulsion, such as RHOPLEX B-74; 0.5 weight percent of colloidal silica, such as LUDOX AM; and 0.15 weight percent of $H_2O_2$. This emulsion is obtained by mixing 119 g. of solution A, 145 g. of solution B, 5 g. of Solution E, and 714 g. of deionized water. The solutions are mixed rapidly at a high speed, and a sufficient quantity of solution D is added to adjust the pH to about 9.0, but not more than 9.5. Seventeen grams of solution C is added under agitation and the emulsion is mixed rapidly for 1 hour. The solution can be used after a 2 hour holding period, to allow the bubbles to disperse.

EXAMPLE 2

Another embodiment of the filming emulsion has the following composition: 3.0 weight percent of RHOPLEX AC-73, 7.7 weight percent of RHOPLEX B-74, 0.5 weight percent of LUDOX AM, and 0.15 weight percent of $H_2O_2$. This emulsion is obtained by rapidly mixing 72 g. of solution A, 203 g. of solution B, 5 g. of solution E, and 703 g. of deionized water. A sufficient quantity of solution D is added to the mixture to adjust the pH to about 9.0, but not more than 9.5. Then, 17 g. of solution C is added, while it is being agitated. The emulsion is mixed for 1 hour and held for at least 2 hours before being used.

EXAMPLE 3

A final embodiment of the filming emulsion has the following composition: 7.7 weight percent of RHOPLEX AC-73, 3.0 weight percent of RHOPLEX B-74, 0.5 weight percent of LUDOX AM, and 0.15 weight percent of $H_2O_2$. This emulsion is obtained by rapidly mixing 167 g. of solution A, 87 g. of solution B, 5 g. of solution E, and 724 g. of deionized water. A sufficient quantity of solution D is added to the mixture to adjust the pH to about 9.0, but not more than 9.5. Then, 17 g. of solution C is added, while it is being agitated. The emulsion is mixed for 1 hour and held for at least 2 hours before being used.

In each of the emulsions, the RHOPLEX AC-73 prevents the formation of a spiral non-uniformity as the limp stream is applied to the rotating panel. The RHOPLEX B-74 provides a high gloss to the resultant film to improve the reflectivity of the after-deposited metallized layer, and the LUDOX AM enhances the uniformity of the film. The pH of the emulsion is kept at about 9.0 to lower the film forming temperature to less than 40° C., and preferably, to below 35° C. Although the preferred concentration of solution E in each of the emulsions is 0.15 weight percent, the concentration may range from 0.05 to 0.5 weight percent.

A comparison of the total organic content of screens made using different filming materials is listed in TABLE 1. The organic content has been normalized to 100 for a solvent-based film.

TABLE 1

| Film Material | Total Organic Content of Screen |
| --- | --- |
| solvent-based spray lacquer | 100 |
| novel emulsion film | 150–175 |
| conventional emulsion film | 250–300 |

Screens prepared using the solvent-based spray lacquer do not require a dedicated panel bake prior to frit sealing of the panel to the funnel, nor do they require a complex combined screen bake and frit sealing cycle because the total organic content of the screen is low (Table 1) and there is sufficient oxygen available in the bulb to volatilize the organics of the screen and the film. However, because of fire-safety and environmental considerations, solvent-based filming lacquers are not favored.

Figure 2:
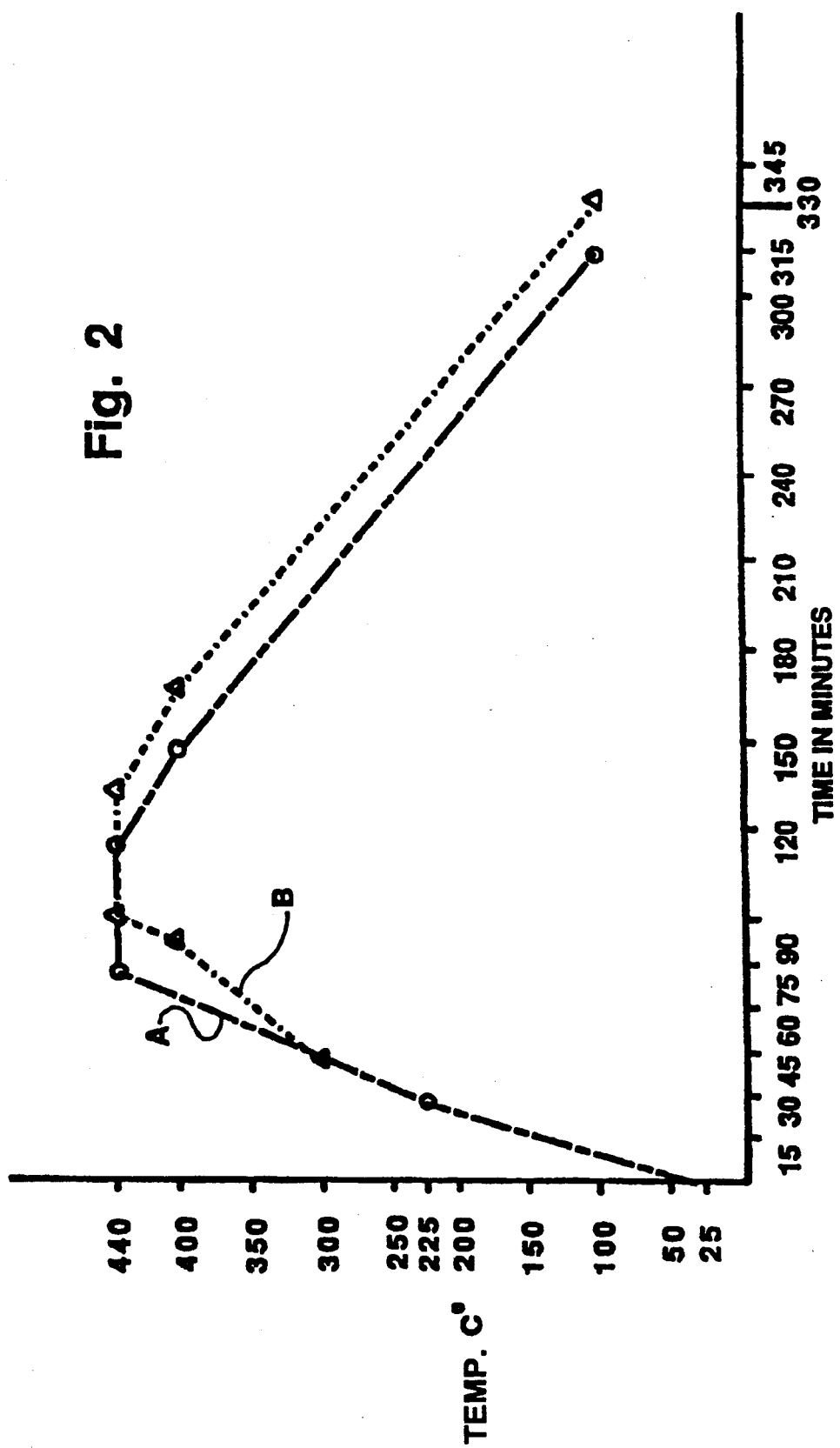
FIG. 2 is a graph representing the temperature profiles experienced by the leading edge of a tube envelope passing through the furnace for a prior frit cycle in which screen bake was a separate step (curve A), and for the novel combined panel bake-frit sealing cycle (curve B).

It has been found that a modification of the conventional frit-sealing cycle, achieved by introducing a more gradual rate of temperature increase through a temperature range extending from about 280° to 400° C. is sufficient to volatilize the emulsion film and to permit a combined panel bake-frit sealing cycle. The conventional frit sealing cycle is listed in TABLE 2 and the novel sealing cycle, including panel bake, is listed in TABLE 3. The temperature profiles of the sealing cycles are graphically depicted in FIG. 2. The frit sealing of the panel to the funnel occurs at a temperature of about 440° C., which is maintained for about 42 minutes. Prior to the combined panel bake-frit sealing operation, a shadow mask (not shown) is located within the panel, in spaced relation to the screen.

TABLE 2

| Temp. (°C.) | Rate of Temp. Change (°C./min.) | Elapsed Time (min) |
| --- | --- | --- |
| 25 to 225 | +7.4 | 27 |
| 225 to 440 | +4.8 | 72 |
| 440 | 0 | 114 |
| 440 to 400 | −1.2 | 147 |
| 400 to 100 | −1.8 | 314 |

TABLE 3

| Temp. (°C.) | Rate of Temp. Change (°C./min) | Elapsed Time (min) |
| --- | --- | --- |
| 25 to 225 | +7.4 | 27 |
| 225 to 300 | +4.8 | 43 |
| 300 to 400 | +2.5 | 83 |
| 400 to 440 | +4.8 | 91 |
| 440 | 0 | 133 |
| 440 to 400 | −1.2 | 166 |
| 400 to 100 | −1.8 | 333 |

Screens made in accordance with the novel method have a screen brightness at least comparable to that of conventional emulsion films which require a separate dedicated screen bake. Additionally, the amount of carbonaceous residue remaining on the screen, after frit sealing, is given in TABLE 4, and is generally less for screens manufactured by the novel process than for screens made using either solvent-based spray films or conventional emulsion films. Additionally, the appearance and integrity of the frit seal made according to the novel method is comparable to that for screens that were filmed with a spray lacquer and baked in a single step sealing process.

TABLE 4

| Film Material | Carbonaceous Residue (PPM) |
| --- | --- |
| solvent-based spray lacquer | 500–600 |
| novel emulsion film | 280–380 |
| conventional emulsion film (with separate, dedicated screen bake) | 350–400 |
| conventional emulsion film (without a separate screen bake) | >2000 |

What is claimed is:

1. A method for manufacturing a metallized luminescent screen for a cathode-ray tube including the steps of depositing at least one phosphor layer on an inner surface of a faceplate of a panel to form said luminescent screen, preheating said panel containing said screen to a temperature in excess of a minimum film-forming temperature, depositing an aqueous emulsion of at least one acrylic film-forming resin onto said screen;

drying said emulsion to form said film, depositing a metallic coating onto said film, sealing said panel to a funnel by heating said panel and funnel through a sealing cycle having predetermined rates of temperature increase, said sealing-cycle including a temperature range within which said film is vaporized, the rate of temperature increase within the film vaporizing range being less than the rate of temperature increase in other portions of said sealing cycle, and cooling said sealed panel and funnel.

2. The method as described in claim 1, wherein said panel containing said luminescent screen is preheated to a temperature that is about 5° to 25° C. above said minimum film-forming temperature of said emulsion.

3. The method as described in claim 2, wherein the resin content of said emulsion is not more than 11 percent, by weight.

4. The method as described in claim 3, wherein said rate of temperature increase within said temperature range in which said film is volatilized is about 2.5° C./minute.

5. A method for manufacturing a metallized luminescent screen for a color cathode-ray tube having a panel sealed to a funnel including the steps of depositing a three color phosphor screen on an inner surface of a faceplate of said panel to form said luminescent screen, preheating said panel containing said screen to a temperature about 5° to 25° C. above a minimum film-forming temperature, depositing an aqueous emulsion of at least one acrylic film-forming resin on said screen, said emulsion having a minimum film-forming temperature of less than 40° C. and a resin content of not more than 11 percent, by weight, drying said emulsion to form said film, depositing a metallic coating onto said film, locating a color selection electrode in spaced relation to said screen, frit sealing said panel to said funnel by heating said panel and said funnel through a sealing cycle, said sealing cycle having a first rate of temperature increase to a first predetermined temperature; a second rate of temperature increase, less than said first rate, to a second predetermined temperature; a third rate of temperature increase, less than said second rate, to a third predetermined temperature, the range between said second and third predetermined temperatures being sufficient to volatilize said film; a fourth rate of temperature increase to a fourth predetermined temperature, said fourth temperature being maintained for a period of time sufficient to effect the frit sealing of said panel to said funnel; and slowly cooling said sealed panel and funnel.

6. The method as described in claim 5, wherein said panel is preheated to a temperature of about 10° C. above said film-forming temperature.

7. The method as described in claim 6, wherein said first rate of temperature increase is about 7.4° C./minute, said first predetermined temperature is about 225° C.; said second rate of temperature increase is about 4.8° C./minute, said second predetermined temperature is about 300° C.; said third rate of temperature increase is about 2.5° C./minute, said third predetermined temperature is 400° C.; said fourth rate of temperature increase is about 4.8° C./minute, and said fourth predetermined temperature is about 440° C.

8. The method as described in claim 7, wherein said fourth predetermined temperature of about 440° C. is maintained for about 42 minutes.

9. The method as described in claim 8, wherein said cooling is at a rate of about 1.2° C./minute from 440° to 400° C. and about 1.8° C./minute to 100° C.

* * * * *